C. V. STUART.
APPARATUS FOR GENERATING AND CARBURETING HYDROGEN.
APPLICATION FILED NOV. 5, 1912. RENEWED DEC. 10, 1913.
1,085,366.
Patented Jan. 27, 1914.
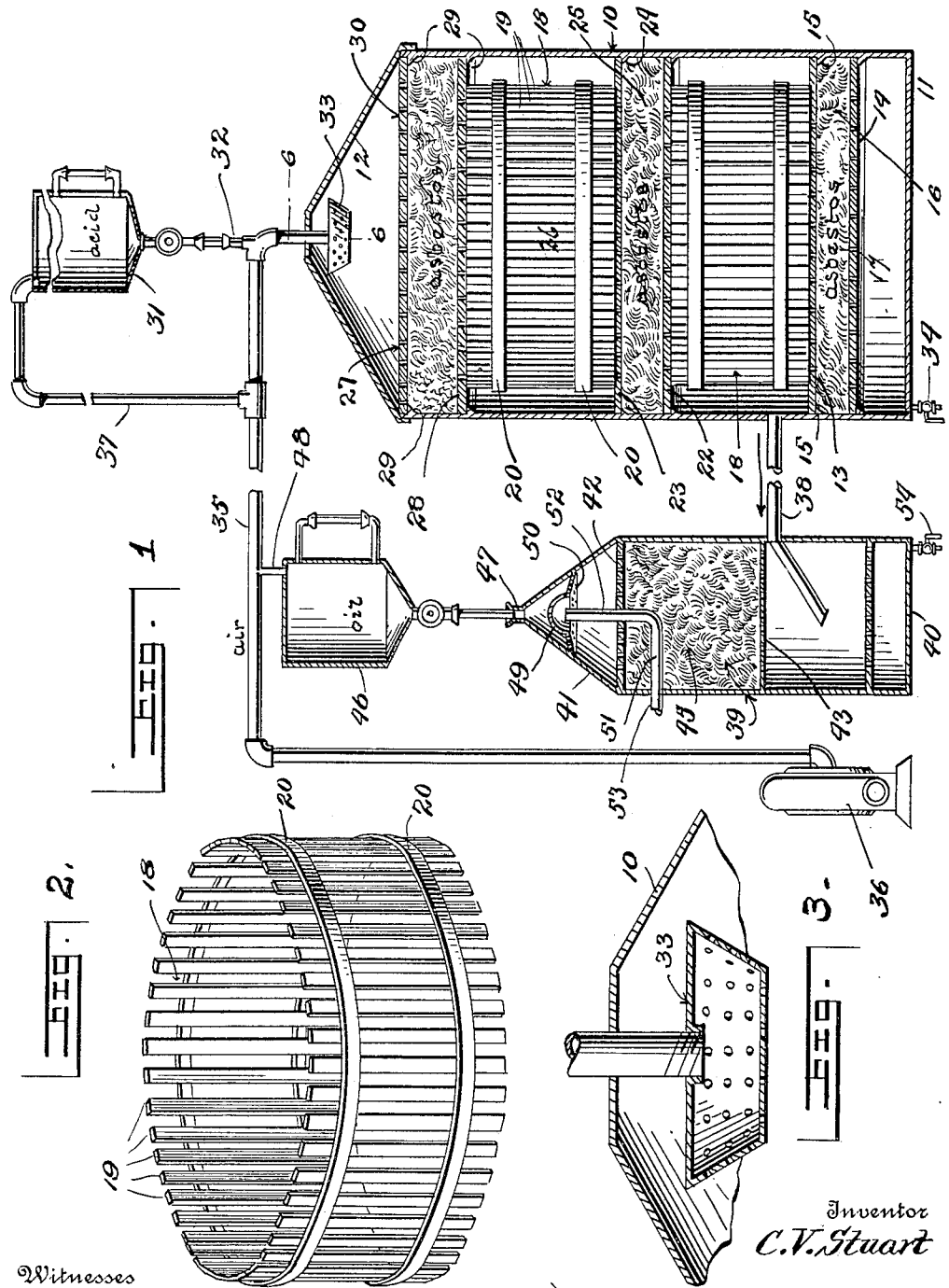
Inventor
C. V. Stuart

UNITED STATES PATENT OFFICE.

CHARLES V. STUART, OF FORT WORTH, TEXAS.

APPARATUS FOR GENERATING AND CARBURETING HYDROGEN.

1,085,366.      Specification of Letters Patent.      Patented Jan. 27, 1914.

Application filed November 5, 1912. Serial No. 729,640. Renewed December 10, 1913. Serial No. 805,863.

*To all whom it may concern:*

Be it known that I, CHARLES V. STUART, a citizen of the United States, residing at Fort Worth, in the county of Tarrant, State of Texas, have invented certain new and useful Improvements in Apparatus for Generating and Carbureting Hydrogen; and I do hereby declare the following to be a full, clear, and exact description of the invention, such as will enable others skilled in the art to which it appertains to make and use the same.

This invention relates to gas producers and has for an object to provide apparatus for manufacturing gas at a smaller cost than hitherto for illuminating and general heating and power purposes.

The improvements relate to providing a main tank which produces hydrogen and an auxiliary tank wherein the hydrogen is mixed with crude petroleum oil and thereby given its illuminating and combustible properties.

Further improvements consist in the provision of a novel main tank equipped with superposed crates for holding scrap iron through which the acid percolates, these crates being spaced in all directions from the sides of the tank whereby the inner wall of the tank is protected from mutilation by the scrap iron.

Still further improvements consist in the provision of novel means for preventing the acid and the oil flow from being checked by the pressure of the gas.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a longitudinal sectional view through the gas producer. Fig. 2 is a detail perspective view of one of the crates. Fig. 3 is a vertical sectional view taken on the line 6—6 Fig. 2.

Referring now to the drawings in which like characters of reference designate similar parts, 10 designates a cylindrical main tank which is closed by a bottom 11 and a conical top 12. Near the bottom a pair of horizontal spaced disk closures 13 and 14 are secured peripherally to the wall of the tank by cleats 15, and a packing element of fibrous nature such as asbestos waste or the like is confined between these closures as shown at 16. Each closure is provided with a concentric series of openings 17.

A crate 18 is supported on the disk closure 13 and is formed of a circular series of vertical slats 19 which are connected by circular hoops 20. The crate is of less diameter than the tank and is concentrically arranged therein so that a space 21 exists between the crate and tank wall. The crate is designed to be filled with scrap iron and retains the same from contact with the inner wall of the tank so that the wall is prevented from being mutilated by the scrap iron. Above the crate 20 a second pair of perforated spaced disk closures 22 and 23 are peripherally secured to the tank wall by cleats 24, and a fibrous packing element 25 preferably asbestos waste is confined between these closures. A second crate 26 a counterpart of the crate 18 just described is supported upon the closure 23 and is also designed to be filled with scrap iron. Above the crate 26 a third pair of perforated spaced disk closures 27 and 28 are peripherally secured to the wall of the tank by cleats 29, and a packing element 30 preferably asbestos waste is confined between these closures.

The inner wall of the tank and also the crates and the closures may be treated with an acid resisting substance such as lead, enamel or the like. Furthermore the marginal portion of each closure outside of the crates is imperforate so that the acid blown down through the tank, as will be presently described, is made to traverse the interior of the crates.

An acid reservoir 31 is supported above the main tank and is preferably filled with inexpensive ingredients that will produce free hydrochloric acid (HCl), such as common salt (NaCl) and nitric acid (HNO$_3$) or sulfuric acid (H$_2$SO$_4$), or other acid. When the salt is treated with acid such as nitric acid, the reaction will be as follows:

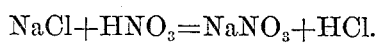

$$NaCl + HNO_3 = NaNO_3 + HCl.$$

Water is also added to dilute the hydrochloric acid and thus reduce corrosive action of the same on the crates and closures and tank.

An acid feed pipe 32 is connected to the bottom of the reservoir 31 and to the top 12 of the main tank and is equipped within the tank with a substantially frusto-conical perforated nozzle 33 through which the acid is sprayed on to the uppermost perforated closure 27. The hydrochloric acid percolates through the closures, packing elements and crates, and acts upon the scrap iron in the crates with a resultant formation of free hydrogen, as indicated in the following reaction.

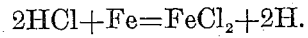
$$2HCl + Fe = FeCl_2 + 2H.$$

The acid is freed from precipitants during passage downward through the packing elements and finally accumulates in the bottom of the tank where it may be drawn off through a faucet 34.

The acid is fed into the main tank under about three pounds pressure, and also an air supply under about three pounds pressure is simultaneously fed into the tank, and mixes with the free hydrogen. To attain this end, an air pipe 35 is preferably connected to a rotary air pump such as is shown conventionally as shown at 36, this pipe entering the acid feed pipe above the main tank cover, and a branch air pipe 37 is connected to the main air pipe 35 and is connected to the top of the acid reservoir. This force feed prevents the gas pressure in the tank from interfering with the proper feeding of the acid into the tank.

The air mixed with free hydrogen, is taken from the main tank by a pipe 38 which enters the main tank and confronts the lowermost scrap iron holding crate. An auxiliary tank 39 is arranged to one side of the main tank and is closed by a bottom 40 and a conical top 41. Near the top the auxiliary tank is provided with a pair of perforated spaced disk closures 42 and 43 which are peripherally secured to the tank, and between these closures a packing element 45, preferably asbestos waste, is confined. The hydrogen pipe 38 from the main tank enters the auxiliary tank below the lower closure 43 and is terminally directed downwardly to about the center of the empty space below the lower closure and bottom of the tank.

An oil reservoir 46 is supported above the auxiliary tank and is preferably filled with crude petroleum oil which is fed into the top of the tank through an oil feed pipe 47 that is connected to the bottom of the reservoir and to the top of the tank. The oil is fed under about three pounds pressure, there being a branch air pipe 48 connected to the main air pipe 35 and to the top of the reservoir to attain this end. A convex spreader 49 is supported within the apex of the tank top by means of a perforated frusto-conical flange 50, this spreader directing the incoming oil toward the sides of the tank. The hydrogen gas rises through the perforated disks 42 and 43 and packing element 45 confined therebetween, and mixes with the incoming crude oil which gives to the gas its illuminating and combustible properties.

The made gas is conducted from the chamber in the top of the auxiliary tank by means of an L-shaped pipe 51 the elbow of which is disposed within the packing element 45, the upright leg 52 of the pipe terminating within the concavity of the convex spreader 49, and the horizontal leg 53 of the pipe projecting through the side of the tank. The surplus oil percolates through the closures and packing element, and saturates the latter, whereby a mixing of the hydrogen gas and oil will take place during passage of the gas up through the packing element, the oil finally accumulating in the bottom of the tank and may be drawn off therefrom by means of a faucet 54.

What is claimed, is:—

1. In a gas generating device, a tank, a separate scrap iron holding crate within said tank and spaced from the sides thereof, and a top and bottom for said crate each comprising a pair of perforated disk closures in said tank with a porous packing element therebetween.

2. In a gas generating device, a tank, a separate scrap holding crate within said tank, a pair of perforated disk closures in said tank below said crate with a porous packing element therebetween, a pair of perforated disk closures in said tank above said crate with a porous packing element therebetween, means for passing an acid through said crate said closures and said packing elements, and an outlet pipe connected to said tank.

3. In a gas generating device, a tank, a separate scrap iron holding crate within said tank and spaced from the sides of said tank, a top and a bottom for said crate each consisting of a pair of perforated disk closures in said tank with a porous packing element therebetween, means for passing an acid down through said top said crate and said bottom, means for passing air under pressure down through said top said crate and said bottom, and an outlet pipe connected to said tank below said bottom.

4. In a gas generating device, a tank, a cylindrical crate within said tank adapted to contain scrap iron and comprising a circular series of slats connected together by circular bands and a top and bottom for said crate each comprising a pair of perforated disk closures in said tank with a porous packing element therebetween.

5. In a gas generating device, a tank, a plurality of spaced closures in said tank each comprising a pair of perforated disks with a porous packing element therebetween, a cylindrical skeleton crate confined between adjacent closures and spaced from the side walls of said tank, an outlet pipe connected to said tank, an air inlet pipe opening through the top of said tank and adapted to force air downward under pressure through said closures and crate, and an acid container connected to said air inlet pipe and adapted to force acid under pressure into said tank along with the compressed air.

In testimony whereof, I affix my signature, in the presence of two witnesses.

CHAS. V. STUART.

Witnesses:
ROY STUART,
W. H. DOORE.

Copies of this patent may be obtained for five cents each, by addressing the "Commissioner of Patents, Washington, D. C."